(12) United States Patent
Nashed

(10) Patent No.: US 6,654,749 B1
(45) Date of Patent: Nov. 25, 2003

(54) METHOD AND SYSTEM FOR SEARCHING INDEXED INFORMATION DATABASES WITH AUTOMATIC USER REGISTRATION VIA A COMMUNICATION NETWORK

(75) Inventor: Ashraf H. Nashed, Whitehouse Station, NJ (US)

(73) Assignee: Choice Media, Inc., Somerville, NJ (US)

(*) Notice: Subject to any disclaimer, the term of this patent is extended or adjusted under 35 U.S.C. 154(b) by 0 days.

(21) Appl. No.: 09/570,732

(22) Filed: May 12, 2000

(51) Int. Cl.[7] .............................................. G06F 17/30
(52) U.S. Cl. ................... 707/10; 707/3; 707/9
(58) Field of Search ................ 707/3, 5, 9, 4, 707/10; 705/51, 52

(56) References Cited

U.S. PATENT DOCUMENTS

| | | | |
|---|---|---|---|
| 5,265,065 A | 11/1993 | Turtle | 395/600 |
| 5,418,948 A | 5/1995 | Turtle | 395/600 |
| 5,454,105 A | 9/1995 | Hatakeyama et al. | 395/600 |
| 5,544,049 A | 8/1996 | Henderson et al. | 364/419.19 |
| 5,606,691 A | 2/1997 | Watts et al. | 395/285 |
| 5,651,101 A | 7/1997 | Gotoh et al. | 395/62 |
| 5,675,788 A | 10/1997 | Husick et al. | 395/615 |
| 5,729,741 A | 3/1998 | Liaguno et al. | 395/615 |
| 5,742,816 A | 4/1998 | Barr et al. | 395/615 |
| 5,768,581 A | 6/1998 | Cochran | 395/615 |
| 5,778,367 A | 7/1998 | Wesinger, Jr. et al. | 707/10 |
| 5,781,904 A | 7/1998 | Oren et al. | 707/100 |
| 5,790,785 A * | 8/1998 | Klug et al. | 713/202 |
| 5,802,515 A | 9/1998 | Adar et al. | 707/5 |
| 5,802,524 A | 9/1998 | Flowers et al. | 707/103 |
| 5,826,261 A | 10/1998 | Spencer | 707/5 |
| 5,870,751 A | 2/1999 | Trotter | 707/102 |
| 5,873,080 A | 2/1999 | Coden et al. | 707/3 |
| 5,895,464 A | 4/1999 | Bhandari et al. | 707/73 |
| 5,903,892 A | 5/1999 | Hoffert et al. | 707/10 |
| 5,905,862 A | 5/1999 | Hoekstra | 395/200.32 |
| 5,911,138 A | 6/1999 | Li et al. | 707/73 |
| 5,913,210 A * | 6/1999 | Call | 707/4 |
| 5,915,240 A | 6/1999 | Karpf | 705/2 |
| 5,924,090 A | 7/1999 | Krellenstein | 707/5 |
| 5,940,821 A | 8/1999 | Wical | 707/3 |
| 5,960,411 A | 9/1999 | Hartman et al. | 705/26 |
| 5,978,799 A | 11/1999 | Hirsch | 707/4 |
| 6,073,106 A * | 6/2000 | Rozen et al. | 705/3 |
| 6,085,186 A * | 7/2000 | Christianson et al. | 707/3 |
| 6,253,198 B1 * | 6/2001 | Perkins | 707/3 |

* cited by examiner

*Primary Examiner*—Greta Robinson
(74) *Attorney, Agent, or Firm*—Norris, McLaughlin & Marcus, PA (57) ABSTRACT

A search engine is for accessing indexed information sources with automatic registration of information sources requiring registration and without requiring the submission of user identification data by the user each time that access to a registration information source is desired. The search engine obtains user information data from a user from a single submission to provide automatic access to all indexed registration information sources, as may be required by the search query and the selections of respective classification categories selected for narrowing the search. A user web page at the search engine stores search queries and corresponding search results. The search engine performs automatic search updating and notifies a user of the update based on user requests.

14 Claims, 3 Drawing Sheets

METHOD AND SYSTEM FOR SEARCHING INDEXED INFORMATION DATABASES WITH AUTOMATIC USER REGISTRATION VIA A COMMUNICATION NETWORK

FIELD OF THE INVENTION

The present invention relates to method and system for searching information databases and, more particularly, method and system for electronically searching indexed information databases of information sources accessible over the Internet with automatic user registration.

BACKGROUND OF THE INVENTION

Electronically searchable information databases interconnected through communication links, computers and computer networks, such as the Internet, provide consumers or others who desire to access, i.e., search for or retrieve, information concerning a topic of interest with a vast, although decentralized, data depository from which information related to the topic can be accessed. These information databases constitute sources of information which are constantly growing in number. The information sources can contain information which is in text, image, audio, video and multi-media formats and which is, preferably, arranged on graphical web sites or web pages accessible on the World Wide Web via the Internet. An Internet user can choose from one of a number of search services or search engines to search for information on a topic of interest and to retrieve web pages corresponding to web page titles identified in the search results of such searches as being related to the topic of interest. Often, the Internet user encounters obstacles in the quest to search, with relative ease and speed, web pages which are likely to contain highly relevant and high quality information concerning a topic of interest. The information sources which can be searched rapidly and easily over the Internet usually are those that do not require payment of a fee or registration before access is permitted. Furthermore, such information sources usually have too much irrelevant information, insufficient relevant information and information which is not of high quality. Also, search engines typically use primitive and undeveloped search procedures that return a large number of irrelevant web page hits that a user must view individually. It is common that an Internet user will only retrieve and view the first few web page hits returned for a particular search.

Moreover, if an Internet user desires to search for information concerning a narrowly defined and specialized topic of interest, such as information concerning a particular medical ailment, the shortcomings of Internet searching described above do not allow for easy and rapid access to highly relevant and high quality information concerning such specialized topic of interest. For example, a layperson or a trained health care professional, such as a physician, nurse or medical technician, who desires to obtain specialized information related to a narrowly defined topic of interest, such as cardiopulmonary edema, does not have available a search engine which can be used to search the World Wide Web effectively, quickly and easily for information on such narrowly defined topic of interest in a large number of information sources containing highly relevant and high quality information content.

Some owners of information sources containing premium content or specialized information have made their information databases available for searching over the Internet in the form of fee-based subscription services requiring registration. An Internet user often is reluctant to and typically does not access such subscription services because the procedure of initially registering with such a service and subsequently providing a password or login information to access the information database of the service as a registered user is too cumbersome and time consuming. Although some subscriptions services allow searching of titles or the bodies or full text content of web pages contained in their information databases without registration, registration is required subsequently when the user clicks on a web page hit displayed on the user's browser to retrieve the web pages corresponding to the web page hit where such web pages are linked to a subscription service. Further, the time overhead associated with having a user provide registration information several times during a search or for each search performed is very burdensome, especially for a person, such as a busy and time-pressed physician, who may require immediate access to specialized information or desire that the same searches be repeated subsequently to ensure that the person remains informed of new developments in a specialized area of interest. Consequently, an Internet user generally limits a search for specialized information to information sources which do not have registration requirements or possibly to only a single subscription service, thereby decreasing the opportunity of identifying the most pertinent and highest quality information for a search query.

Therefore, there exists a need for a search engine capable of accessing information sources whose information databases have been indexed to provide that high quality and highly relevant information concerning a topic of interest is identified for a search query, which automatically registers a user with an information source requiring registration for access to provide that such source can be searched and information can be retrieved therefrom without having the user provide any user identification data to such source and which can update the search results for a search query with relative ease and minimal time expenditure by the user.

SUMMARY OF THE INVENTION

In accordance with the present invention, method and system for electronically searching information databases of information sources, which can be accessed for free or on a subscription fee basis, provide for access to information on a topic of interest using a search engine which searches information databases whose data records have been indexed into index fields, such as title, full text content and classification category with a plurality of selections, and where indexing data is stored at an indexed database coupled to the search engine. The search engine, in addition, utilizes user identification data obtained a single time from a user and stored in a user identification database coupled to the search engine to register the user automatically with an information source requiring registration for access, such as a subscription service, without requiring any submission of user identification data by the user when access to such registration information source is desired, thereby increasing the speed and ease with which a large number of indexed information sources, including fee-based premium content subscription information sources, can be accessed.

In a preferred embodiment, the system is an Internet search engine for searching the World Wide Web and includes a server engine which is interconnected with a user identification database, an indexed web page database and a user web page database. The user identification database stores user identification data for system users and registration compatibility information for information sources requiring registration for access to provide for automatic registration of a system user with an information source requiring registration for access, for example, a medical and health care information fee-based subscription service, and whose web pages are linked to the system and indexed at the indexed web page database. The user identification database, preferably, stores transaction data representative of the transactions, e.g., searches for or retrievals of information, that are performed by a user at information sources requiring registration for access to provide for accounting and subscriber service management for such information sources, as may be required. The classification categories for web pages indexed in the indexed web page database can include categories obtained by automatic web-traversing programs called robots or spiders and, preferably, categories and respective selections generated by review of the content of web pages by a human viewer.

In one preferred embodiment, the server engine includes a query server containing a search processor which performs searching of the indexed database based on the search query entered and expansion words generated from the search query using semantic network expansion. The query server uses selections in the respective classification categories selected by the user to limit the web page hits returned in the search results. The classification categories can include: type of web page having selections such as text, image, audio, video, multimedia, etc.; subject matter description of web page; and target audience of web page having selections such as health care professional or patient. Preferably, the searching is performed on web pages indexed into selections of respective classification categories by a human viewer. The query server ranks the relevancy of web pages identified as web page hits based on the match which has been identified between the original search query or the expansion words and the indexed data in the index fields of the indexed database.

In a preferred embodiment, the rank value for a web page hit identified as a match is computed based on whether the identification resulted from a match between the search query or expansion words and those words contained in a title or full text context index field for web pages and, more preferably, furthermore based on the relative proximity and frequency of occurrence of search query or expansion words within the web page body of a web page for which a match has been identified.

In a further preferred embodiment, the search engine includes an automatic search component to provide (i) that a search for a search query automatically is repeated at user defined intervals, (ii) that the web page hits identified from a repeated search for a search query are stored on a user web page maintained at the user web page database, and (iii) that the user is notified when the search results for a search query have been updated, preferably, electronically by such means as email, facsimile or automatic telephone messaging. Each user web page preferably includes the user's search queries and the links of the web page hits for the original search results and the updated search results, respectively.

In still a further preferred embodiment, the server engine utilizes user identification data in the user identification database to provide that the user can purchase services and products offered for sale by a registration information source which is also an e-commerce web site, and whose web pages may or may not be indexed in the indexed database, without requiring the user to provide any user information data, such as a credit card number, to such e-commerce web site. Based on a pre-established data exchange protocol agreed upon between the respective owners of the search engine and the e-commerce web site, the server engine automatically, without any submission of user information by the user, submits user identification data to and receives transaction data from the e-commerce web site to facilitate payment for products or services purchased by the user.

BRIEF DESCRIPTION OF THE DRAWINGS

Other objects and advantages of the present invention will be apparent from the following detailed description of the presently preferred embodiments, which description should be considered in conjunction with the accompanying drawings in which.

DETAILED DESCRIPTION OF PREFERRED EMBODIMENTS

Figure 1:
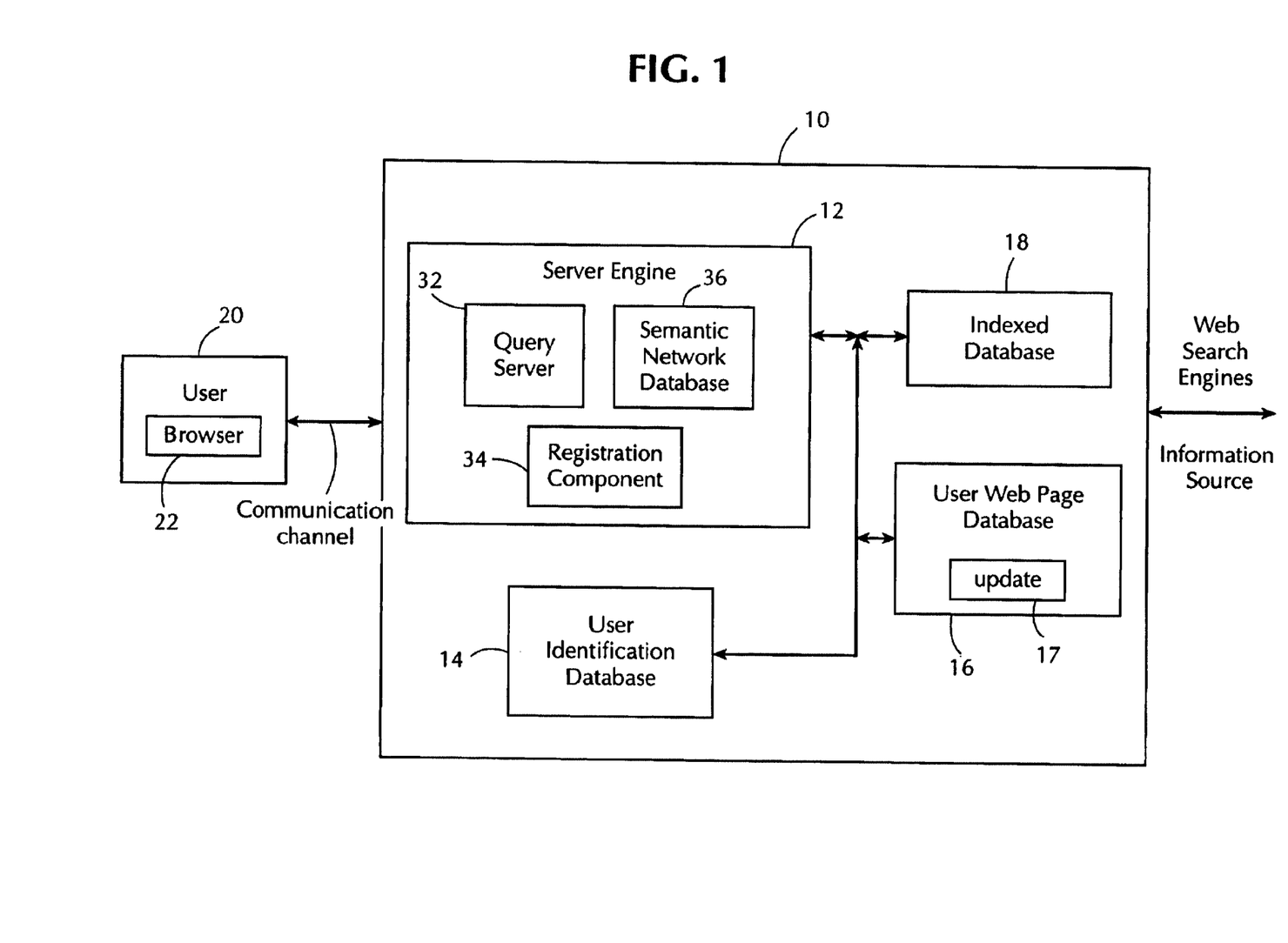
FIG. 1 is a block diagram of one embodiment of the invention.

FIG. 1 shows in block diagram form an embodiment of a server system 10 for accessing information databases of information sources on the World Wide Web over the Internet in accordance with the present invention. The server system 10 includes a server engine 12 interconnected with a user identification database 14, a user web page database 16 and an indexed database 18. The server engine 12 receives requests (e.g., a hypertext transfer protocol ("HTTP") request), such as requests to access web pages of information sources, from a user system 20, including a browser 22, that interacts with the system 10. Based on the requests, i.e., search queries entered as well as selections of respective classification categories entered by a user to focus and narrow the searching of information databases in accordance with the present invention, the system 10 accesses indexed web pages of information sources to which the system 10 is linked. The indexed information sources can be a part of an information database which is coupled to the system 10 or a search engine which is included in or linked to the indexed database 18. Accessing an indexed web page can constitute searching indexing data for the indexed web pages stored in the indexed database 18 or retrieving the contents or body of an indexed web page whose title is identified as a web page hit in the search results.

It is to be understood that each of the components in the server system 10 which is described below as performing data processing operations is a software module or, alternatively, a hardware module or a combined hardware/software module. In addition, each of the server engine 12 and databases 14, 16, 18 suitably contains a memory storage area, such as RAM, for storage of data and instructions for performing processing operations in accordance with the present invention. Alternatively, instructions for performing processing operations can be stored in hardware in one or more of the databases in the system 10.

The user identification database 14 contains in its memory user identifiers each of which uniquely identifies a user who has registered with the system 10 to access indexed web pages through his browser. The user identifier for each user contains personal information, such as the name, residence address, telephone number, e-mail address and a credit card billing number of the user. The user database 14 further includes registration compatibility information, such as a login and password, for each of the information sources whose web pages are indexed in the indexed database 18 and which requires user registration prior to access. The registration compatibility information provides for automatic registration of the user with an information source whose web pages are indexed in the system 10 and which requires registration for access to avoid the user having to submit any user information data each time that access to such source is desired, as explained in detail below. For ease of reference, an information source whose web pages are indexed in the indexed database 18 is referred to as an indexed information source and an information source requiring registration prior to access is referred to as a registration information source.

The indexed database 18 includes its memory indexing data which indexes web pages of information sources to Which the system 10 can be linked. The web pages are indexed by index fields which can include, for example, title of web page, subject matter description of web page and full text content of web page. In a preferred embodiment, the index fields include classification categories, such as, for example, data format of the web page having the selections text, image, audio, video, multimedia, etc.; type of specialized content found in the web page; and target audience of the web page. An index field, such as a classification category and its selections, can be generated by automatic means or human review of web pages.

In a preferred embodiment, the index fields are arranged in the memory of the indexed database 18 in a form representative of tables, such as in Access or Excel format, where the index fields are columns and where the row entries for each of the columns contain indexing data for respective linked web pages. For example, for an index field constituting a classification category, the row entries contain selections of such classification category corresponding to respective linked web pages.

In one preferred embodiment, the server engine 12 provides that the classification categories and their respective selections in the indexed database 18 are displayed at the browser 22. In connection with entry of a search query, the user would select a selection from one or more of the classification categories to narrow the search made by the system 10 in accordance with the present invention. For example, the following classification categories and respective selections can be established to narrow and effectively focus a search of indexed web pages concerning health care and medical information: (i) content of web page can include the selections of In Depth Review/Chapter, Brief Review, Information for Patients, Case Presentation, Simulation, Practice Guidelines, New Articles, etc.; (ii) data format of web page can include the selections of Photographs, ECGs, Radiographs, CT Scan, MRI, Other Images, etc.; and (iii) target audience can include the selections of Physician, Nurse, Medical Technician, Patient, etc.

In a further preferred embodiment, the classification categories and their respective selections corresponding to the indexed web pages of the indexed information sources are created and assigned to the indexed web pages based on review of the bodies of such web pages by human viewers, i.e., not by electronic means such as automatic web-traversing robots or spiders. For example, specialized information sources containing health care and medical information web pages would be reviewed, selected for indexing, assigned classification categories relating to type of web page, content and target audience and designated to correspond to selections of the respective classification categories by board certified physicians. In addition, the indexed database 18 can store summary subject matter description identifiers of indexed web pages which, preferably, are developed by humans.

Referring to FIG. 1, the server engine 12 includes a query server 32, a registration component 34 and a semantic network database 36. In accordance with the present invention, the server engine 12 performs operations to provide for automatic registration of a user with a registration information source, such as a subscription fee-based information source. The server engine 12 retrieves user identification and registration compatibility data stored in the user database 14, provides to the registration information source a registration identifier for the user derived from such retrieved data and receives from the registration information source and stores in the user database 14 transaction data identified with the registration identifier of the user. The transaction data is representative of the operations performed by a user, such as a search for information contained at or retrieval of a web page from the registration information source, and the fees, if any, incurred by the user for such operations. The respective owners of the server system and the registration information source would be parties to an agreement that provides that the necessary registration identifier and transaction data can be generated and exchanged electronically between the server system and source to provide automatic registration of the user at the source to which access is desired.

Thus, the necessity of a user providing a full complement of identification data, including billing information, each time that access to a registration information source is desired is avoided. Also, the need for the user to submit any identification data, such as login and password information, for subsequent access to a registration information source with which the user has already been registered by the system 10 is also avoided. Hence, the user can have one or more searches performed with relative ease, minimal burden and great speed on any number of registration information sources having high quality information content and linked to the system 10 in accordance with the present inventive technique.

Figure 2:
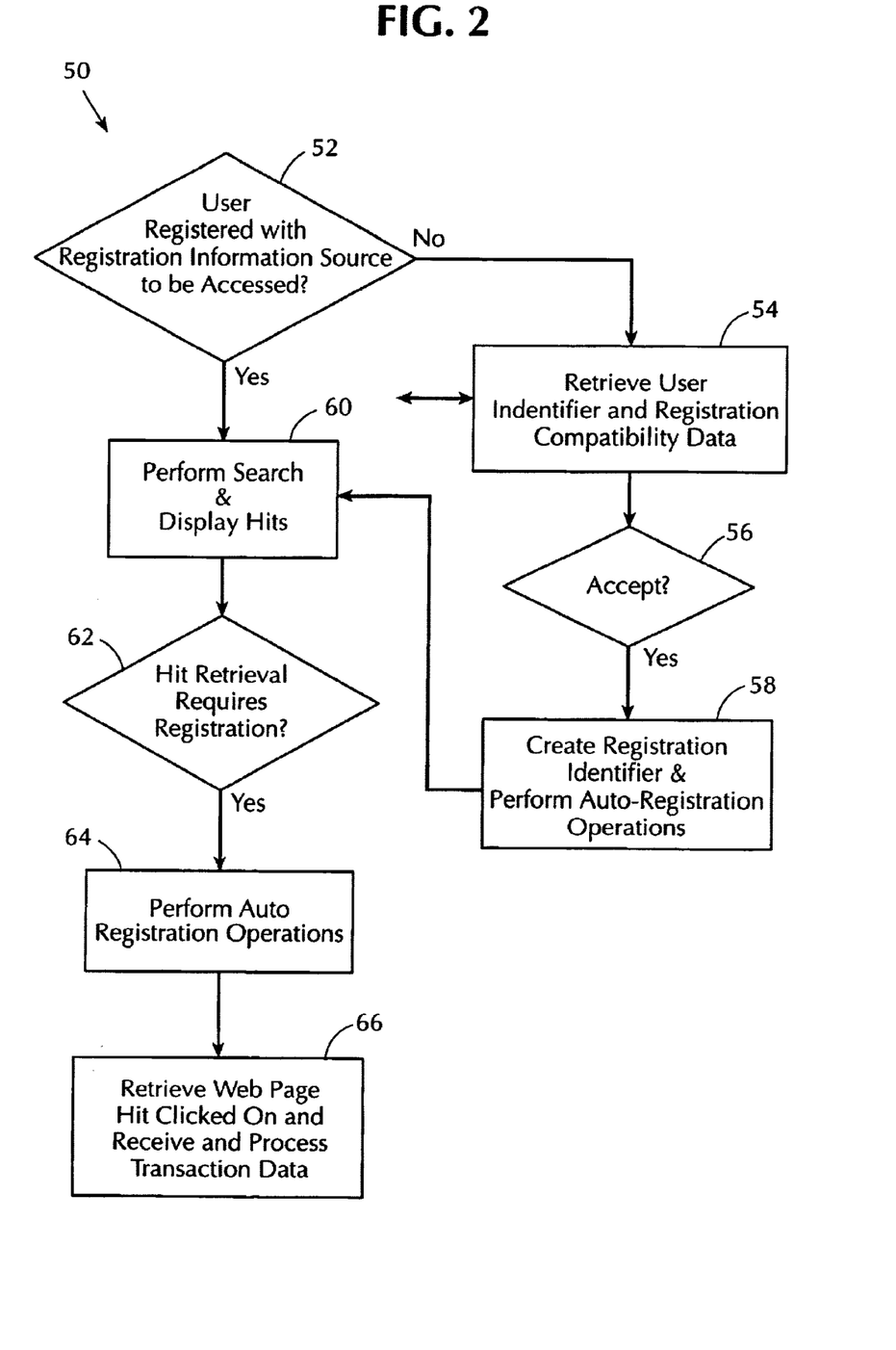
FIG. 2 is a flowchart of an automatic registration method according to one embodiment of the invention.

The registration component 34 of the search engine 12 performs steps of an exemplary automatic registration process 50, as shown in FIG. 2, to register the user automatically with a registration information source for which access is desired, thereby speeding user access to any information which is stored at or linked to such source. The process 50 is described below with reference to a search process for (i) scanning the titles and bodies of web pages of information to identify matches to a search query that a user has entered at the user system 20, and (ii) retrieving web page hits corresponding to the web pages reported as matching the search query in the search results. It is to be understood, however, that the steps of the process 50 can be incorporated into any search process, such as the inventive search process 70 described below, to provide automatic user registration enhancements to Internet searching.

Referring to FIG. 2, in step 52, the registration component 34 determines whether the system 10 previously has registered the user with a first registration information source which is to be accessed in accordance with the automatic registration functionality of the system 10. For purposes of illustration, it is assumed that the user has entered a search query, that the user already has provided user identification data a single time to the system 10 and that the system 10 has suitably stored such user identification data in memory in the user database 14.

If the determination in step 52 is no, in step 54, the registration component 34 retrieves from the user database 14 the user identifier data for the user and registration compatibility data for the first registration information source and then proceeds to step 56. In step 56, the query server 32 provides that a clickable "ACCEPT REGISTRATION" box is displayed on the browser 22 of the user system 20 and also that the conditions, including fees, for registration are displayed. If the user clicks on the box, in step 58 the registration component 34 generates a registration identifier for the user based on the retrieved user identifier data and the registration compatibility data for the first registration information source, stores the registration identifier together with the user identifier in the user identification database 14 and transmits the user registration identifier to the first registration information source.

For purposes of illustration, it is assumed that the titles and bodies of the web pages of the first registration information source can be scanned to determine if any match to a search query exists without any registration by the user with the first registration information source. It is further assumed that registration must be performed with such first registration information source before the user can retrieve the entire contents or body of a web page corresponding to a web page hit. Referring again to FIG. 2, if the determination in step 52 was yes or after step 58, the query server 32 in step 60 scans the titles and bodies of the web pages of the first registered information source and displays as clickable links on the browser 22 titles of the web page hits identified as matching the search query. At this stage of the search, the user would then click on the titles of one or more of the web page hits to retrieve the body of the corresponding web page.

In step 62, the registration component 34 determines whether the first registration information source requires user registration before the body of the web page hit can be retrieved. If the determination in step 62 is yes, the registration component 34 in step 64 transmits a registration identifier to the first registration information source without any prompting to the user and without requiring the user to enter any user information data at the browser 22 by, for example, mouse clicks, typing, etc. It is to be understood that, in accordance with the present invention, the operations of step 64 can be performed as the initial operations in step 60 if the first registration information source requires user registration prior to the performance by the system 10 of scanning of the bodies of its web pages.

After step 64, the query server 32 in step 66 retrieves the contents of the web page hit on which the user clicked and also receives any transaction data which the registration information source transmits. The transaction data is representative of any search and retrieval of web page operations performed by the user at the registration information source, the costs of such operations and other billing data. The registration information source can be a subscription service which charges, for example, a fee only for retrieval of web page hits, a flat monthly fee or a time of access fee. The transaction data can include billing data reflecting credits incurred by the user based on access operations. Further in step 66, the server engine 12 stores the transaction data for the user in the user identification database 14 to provide for later processing, which may include accounting and subscriber service management provided by the system 10 for the registration information source. For example, the system 10 can provide, based on the transaction data received for a user, direct billing of the user for accesses made to a fee-based registration information source.

In one preferred embodiment, the server engine 12 manages all data processing concerning payments to be made to a registration information source for user access. The necessary accounts, data exchange protocol and processing steps to generate registration identifier data to provide for automatic registration in accordance with the present invention are established by agreement between the owner of the system 10 and the owner of the registration information source.

It is well known that a web page or web site may be operated by an e-commerce product and service provider that offers a variety of products and services for purchase. For example, the web page retrieved for a search query directed to a specialized medical topic of interest may also offer medical products, such prescription or non-prescription drugs or medical devices, for purchase by a patient or a physician or health care service provider, such as a clinic or hospital. In a further preferred embodiment, in step 66, the registration information source transmits transaction data which includes a record of any e-commerce purchase of goods and services that the user has made at a web page of the registration information source. The user can make such purchases based on the pre-existing registration with the registration information source. The server engine 12 stores such e-commerce transaction data identified with the user identifier in the database 14. Advantageously, automatic registration with the registration information source also avoids the need for the user to provide, for example, credit card number information in connection with an e-commerce transaction made at a web page, thereby speeding and easing the ability of the user to purchase potentially desired products and services related to a topic of interest with minimal incremental effort as part of an Internet search.

Hence, the automatic registration functionality of the system 10 provides that a user can access information of a registration information source and also purchase products and services offered for sale by the registration information source without requiring the user to enter any user identification data, including even login and password information. The registration component 34 and other components in the system 10 facilitate automatic electronic data exchange between the system 10 and the registration information source without any user involvement during operations performed at web pages of the registration information source, which can include purchases of products or services offered for sale on a web site. The automatic registration feature is particularly desirable because, once a user initially provides user identification data to the system 10, registration with a plurality of information sources, some of which can be premium content subscription-based registration information sources, is performed rapidly and automatically as may be required. This provides for rapid and easy searching of indexed information sources, as many times as desired by the user, so that current, accurate and high quality information on a topic of interest can be obtained. Also, the transaction data transmitted from the registration information source can include billing information to provide users with the opportunity to purchase products and services which a registration information sources may make available for purchase easily and with minimal burden and without requiring the user to submit any information, such as to re-enter any user identification data or enter login and password information, for an e-commerce transaction at each registration information source accessed.

Referring to FIG. 1, the user web page database 16 is a data storage medium, such as RAM, for search access data. The server engine 12 stores in the user web page database 16 search access data representative of the search queries, any search limiting selections of respective classification categories selected by the users for respective search queries and the web page hits reported for a search performed based on the search query and the selections of the respective classification categories selected. The search access data can be retrieved by the server engine 12 for display on the browser 22 of the user system 20 on a distinct user web page established for each user who has submitted user identification data to the server engine 12 according to the present invention to provide for automatic registration with a registration information source. The user, therefore, can refer to the user web page, which is accessible through the server system 10, to review prior search queries and respective search results as desired.

The web page database 16 also includes an update component 17 which can interchange data with the server engine 12 to provide that a search query previously entered by a user, and having corresponding search results stored on a user web page, is repeated subsequently at predetermined intervals defined by the user. Further, the update component 17 can provide that the new web page hits returned for a repeated search are stored as updates at the user web page in connection with the corresponding search query. In a preferred embodiment, the update component 17 causes clickable update selections for controlling repeated searching to be displayed at the browser 22. The user would click on the appropriate update selection to control the manner in which, for example, by electronic means such as e-mail, fax, telephone, and how often the user is notified that new web page hits have been returned for a particular search that was repeated.

In accordance with one aspect of the present invention, when the user connects the user system 20 to the server system 10 by, for example, submitting a password string provided by the system 10 to the user as part of the initial, one time registration with the system 10, the query server 32 of the server engine 12 provides that classification categories and their respective selection for the indexed web pages are displayed at the browser 22 to provide that a search in connection with a particular search query can be narrowed and focused. The query server 32, preferably, performs a search only on the indexed information sources, which can include registration information sources. The search processing can include mapping of words in the search query to expansion words using semantic network expansion. The expansion words for particular query words are stored in a semantic network database 36 in the server engine 12. Preferably, human reviewers create the expansion words for respective query words and also the classification categories and their respective selections to maximize the number of relevant web page hits reported for a search. For example, highly trained and board certified physicians can generate specialized expansion words for medical words which are likely to be included in a specialized medical information search query and otherwise not available in ordinary semantic networks to improve the quality of the results obtained for a search for specialized information in the medical and health care area. In a preferred embodiment, the classification categories and their respective selections are used to narrow the population of indexed web pages considered in a search.

Figure 3:
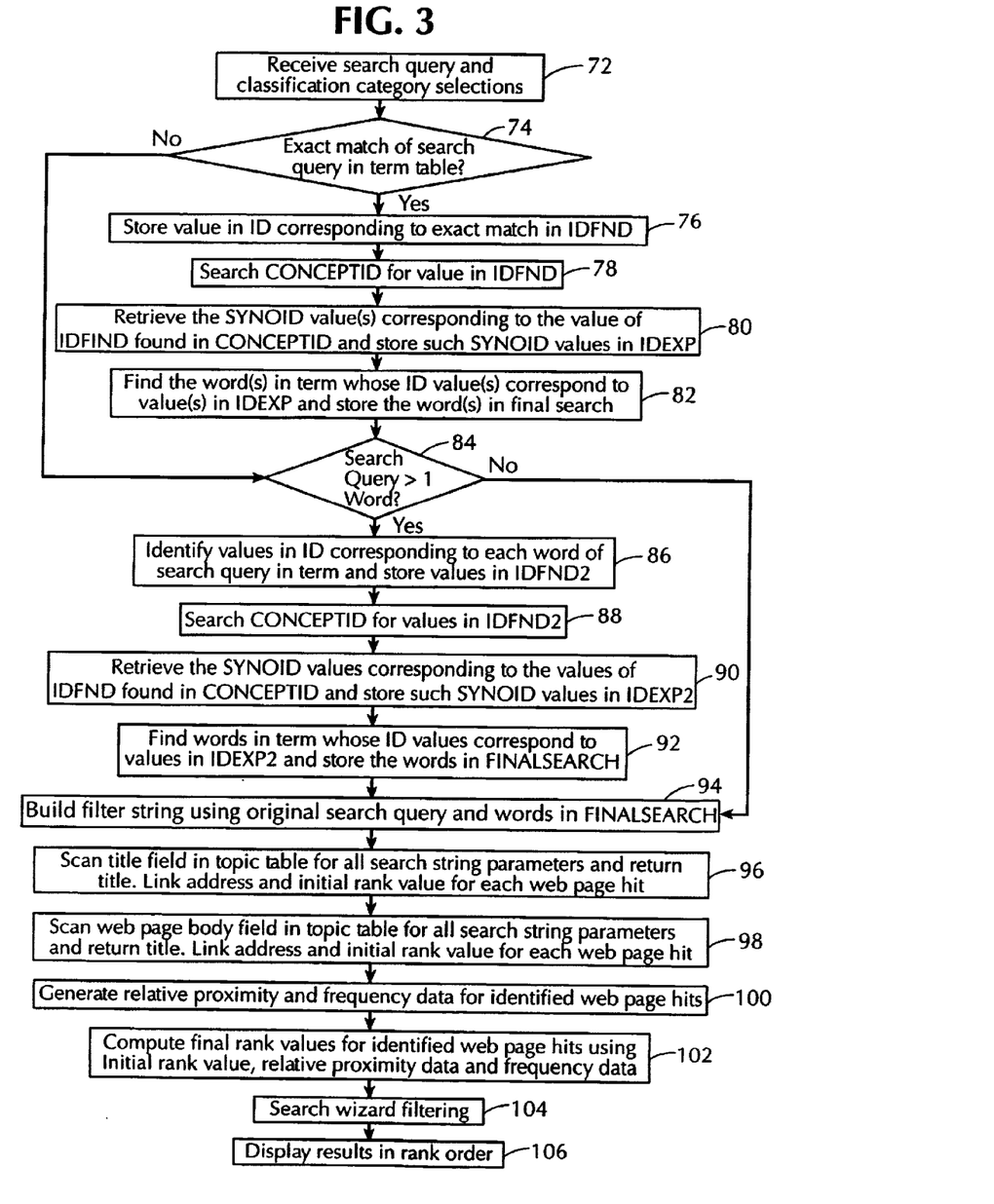
FIG. 3 is a flowchart of a search method according to one embodiment of the invention.

FIG. 3 is a flow diagram of an exemplary process 70 that the query server 32 can perform in accordance with the present invention to search web pages of information sources, which are linked to the system 10 and have been indexed in the indexed database 18, using selections in respective classification categories selected by a user and also using semantic network expansion of the search query. In a preferred embodiment, the semantic network database 36 has data stored in its memory in a form representative of tables with multiple columns where data in a row of one column corresponds to data in a corresponding row of another column. In a preferred embodiment, the database 36 contains data stored in its memory in a form representative of a table SEARCH TERM having a column TERM, which includes rows each of which contains a word or word string, and a column ID, which includes rows each of which contains an identification number value corresponding to a word or word string in a corresponding row in TERM. The database 36 further includes data stored in a form representative of a table CONCEPT having a column CONCEPTID, which includes rows each of which contains an identification number value, and a column SYNOID, which includes rows each of which contains one or more identification number values that correspond to an identification number value in a corresponding row in CONCEPTID. Each of the identification number values in columns ID, CONCEPT ID and SYNOID corresponds to a word or word string in column TERM.

In one preferred embodiment, the server system 10 is configured to provide for specialized searches concerning medical information such that the words or word strings in the TERM column of SEARCH TERM would concern medical and health information and the table CONCEPT would be used to relate medical terms to each other using the values of identification numbers in ID, CONCEPT ID and SYNOID. Example 1 below shows an exemplary arrangement of medical and health information in tables SEARCH TERM and CONCEPT.

EXAMPLE 1

| SEARCH TERM | |
| --- | --- |
| TERM | ID |
| lung cancer | a |
| . | . |
| . | . |
| . | . |
| lung | b |
| . | . |
| . | . |
| . | . |
| cancer | c |
| . | . |
| . | . |
| . | . |
| large cell carcinoma | a' |
| . | . |
| . | . |
| oat cell carcinoma | b" |

| CONCEPT | |
| --- | --- |
| CONCEPTID | SYNOID |
| a | a', a" |
| b | b', b" |
| c | c', c" |

It is to be understood that the contents and the relationship between words or word strings established using identification number values in the tables SEARCH TERM and CONCEPT can be updated periodically and changed to concern other topics as suitable.

Referring to FIG. 3, in step 72, the query server 32 receives a search query entered by the user and any selections in classification categories selected by the user for narrowing the search. In a preferred embodiment, the query server 32 causes classification categories and their respective selections established for the web pages indexed in the indexed database 18 to be displayed at the browser 22. A user can select a selection from one or more categories to narrow, i.e., refine, a search query such that highly relevant and high quality search results are more likely to be obtained based on a search of the web pages indexed at the indexed database 18. In the preferred embodiment, the query server 32 accesses web pages indexed in the database 18 and which have been classified by human reviewers as corresponding to selections of respective classification categories.

In step 74, the query server 32 scans the rows in column TERM of table SEARCH TERM for an exact match of the word or word string constituting the search query. If an exact match is not found, the query server 32 proceeds to step 84. If yes, in step 76, the query server 32 retrieves and stores in location IDFND in memory the value in the row of column ID of the SEARCH TERM table corresponding to the exact match found. In step 78, the query server 32 searches the column CONCEPTID in table CONCEPT for any row having the same value as stored in IDFND. As the CONCEPT table functions to expand the number of search words ultimately to be used in accessing information, it is typical that there are a plurality of values in a row of SYNOID corresponding to the row of CONCEPTID containing the same value as stored in IDFND.

In step 80, the query server 32 retrieves the at least one distinct values in the row of SYNOID corresponding to the value in IDFND contained in a row of CONCEPTID and stores the retrieved values in respective memory locations $IDEXP_{1,2,\ldots,x}$, as suitable. Then, in step 82, the query server 32 searches the table SEARCH TERM to identify any word or word string in a row of TERM having a value in a corresponding row in ID which is the same as a value in $IDEXP_{1,2,\ldots,x}$ and stores the word(s) or word string(s) that are identified in memory locations $FINALSEARCH_{1,2,\ldots,y}$, as suitable.

In step 84, the query server 32 determines whether the search query includes more than one word. If no, the query server 32 proceeds to step 94. If yes, in step 86, the query server 32 retrieves and stores in memory locations $IDFND2_{1,2,\ldots,z}$ the values, respectively, in column ID of SEARCH TERM table corresponding to each word which is within the search query and contained in a row of TERM.

In step 88, the query server 32 searches CONCEPTID for values that are the same as the values stored in $IDFND2_{1,2,\ldots,z}$. As evident, once again, the CONCEPT table is used to expand the number of search words ultimately to be used in accessing information. In step 90, the query server 32 retrieves the at least one distinct values in the rows of SYNOID corresponding to the values of $IDFND_{1,2,\ldots,z}$ contained in respective rows of CONCEPTID and stores the retrieved values in memory locations $ID2EXP_{1,2,\ldots,m}$, as suitable. Then, the query server 32 in step 92 searches the table SEARCH TERM to identify all words or word strings in a row of TERM having values in corresponding rows in ID which are the same as the values in $ID2EXP_{1,2,\ldots,m}$ and stores the words or word strings in the memory locations of $FINALSEARCH_{1,2,\ldots,y}$ that do not already contain data representative of words or word strings. In step 94, the query server 32 retrieves the data stored in $FINALSEARCH_{1,2,\ldots,y}$ and constructs a selection filter string for searching which includes as its parameters the original search query and the words or word strings stored representatively in $FINALSEARCH_{1,2,\ldots,y}$.

For purposes of illustrating the process 70, it is assumed that indexing data is stored in the database 18 in a form representative of a topic table including the index fields, i.e., columns, TITLE, WEB PAGE BODY, TARGET AUDIENCE, DATA FORMAT and LINK ADDRESS. Each WEB PAGE BODY row entry constitutes the full text content of a web page. The columns TARGET AUDIENCE and DATA FORMAT, preferably, constitute classification categories each having one or more selections which are displayed at the browser 22 of the user system 20 and which the user can select to eliminate undesired indexed web pages as potential reported web page hits. For example, a table MEDFINDER for medical information web pages indexed in the system 10 can be configured as shown in Example 2 below.

EXAMPLE 2

| | | MEDFINDER | | |
|---|---|---|---|---|
| TITLE | WEB PAGE BODY | TARGET AUDIENCE | DATA FORMAT | LINK ADDRESS |
| cancer | — | Physician | Multimedia | NSI.com |
| lung cancer | — | Patient | Text | $MED.com |
| brain | — | Nurse | Photo | $HEALTH.com |
| lung | — | Hospital | MRI | paymed.com |
| heart | — | Lay person | Audio | payR$_x$.com |

Referring again to FIG. 3, in step 96, the query server 32 scans the TITLE field of the topic table to identify a match with any of the parameters in the selection filter string and retrieves and stores in memory locations $RESULTS_{1(p,q,r,s,t,u),\,2(p,q,r,s,t,u),\,\ldots\,n(p,q,r,s,t,u)}$ the title and the link address for each web page for which a match was identified. The data corresponding to the title and the link address for an identified web page are stored, respectively, at indices p and q in the RESULTS data array. In addition, the query server 32 stores an initial rank value at index for each identified web page hit data entry stored in the RESULTS data array, based on the match which was made between the parameters in the selection search string and the TITLE indexing data, as follows: match to the exact word or word string constituting the search query, rank equals 90–100; match to all of the words in the search query in any order, rank equals 80–89; match to all of the expansion words generated from the exact word or word string constituting the search query, rank equals 70–79; and match to all of the expansion words generated from each word in the search query, rank equals 60–69.

In step 98, the query server 32 scans the WEB PAGE BODY field of the topic table to identify a match with any of the parameters in the selection search string. Similarly as in step 96, the query server 32 retrieves and stores in $RESULTS_{1(p,q,r,s,t,u),\,2(p,q,r,s,t,u)\ldots n(p,q,r,s,t,u)}$ the title and the link address for each web page for which a match was identified. In addition, the query server 32 stores an initial rank value in the RESULTS data array for each web page hit identified based on a match of the parameters in the search string with those in the WEB PAGE BODY field as follows: match to the exact word or word string constituting the search query, rank equals 50–59; match to all of the words in the search query in any order, rank equals 40–49; match to all of the expansion words generated from the exact word or word string constituting the search query, rank equals 30–39; and match to all of the expansion words generated from each word in the search query, rank equals less than 20–29.

In step 100, the query server 32 determines the frequency of occurrence and the relative proximity to one another of parameters in the selection search string in the text body of each web page which has been identified as a web page hit in steps 96 and 98. The query server 32 stores the frequency and relative proximity data representatively in indices s and t for each identified web page data entry stored in the RESULTS data array. The relative proximity data is desirably generated for use in computing a final rank value, as described in detail in step 102 below, because the closer various words or word strings corresponding to a parameter in the selection search string are to one another in the web page body corresponding to an identified web page hit, the greater the likelihood of relevance for the identified web page hit. In a preferred embodiment, a relative proximity evaluation can be performed for multi-media files utilizing text fields associated with the multi-media files. The frequency of occurrence data similarly can provide an indication of an increased likelihood of relevancy for an identified web page hit and, therefore, also is generated for use in computing a final rank value as set forth in step 102.

In step 102, the query server 32 computes a final rank value for each of the identified web page hits stored as data entries in the RESULTS data array using the initial rank value, the frequency data and the relative proximity data representatively stored at respective indices r, s and t in the RESULTS data array, and stores such final rank value representatively at index u for each of the web pages stored as data entries in the RESULTS data array. For example, if an identified web page had been assigned an initial rank between 80–89 in step 96 and the relative proximity data and frequency data for such web page indicate closer relative proximity and greater frequency of occurrence of parameters of the selection filter string in the text of the web page than that for all other identified web pages which have been assigned an initial rank between 80–89, such identified web page hit would be given a final rank of 89. The final rank values for the remainder of the identified web pages assigned initial rank values between 80–89, and also other initial rank values, i.e., between 40–49, etc., would be computed similarly by comparison of the respective relative proximity and frequency data for the corresponding identified web page hits. Thus, a final rank value is determined for an identified web page hit based on how well the indexed data for the web page matches parameters in the selection filter string.

In a preferred embodiment, a Microsoft® SQL Server 7.0 Full-Text Engine operating in a Microsoft Windows NT® environment can be utilized to generate data representative of the frequency of occurrence and the relative proximity of parameters in the text of a web page and to compute a final rank value using such generated data in combination with the initial rank values assigned to web page hits identified in steps 96 and 98.

In step 104, the query server 32 performs a search wizard filter operation in the topic table to eliminate identified web page hits in RESULTS based on the selections of the respective classification categories selected by the user. For example, referring to the topic table in Example 2, if the user selected Multimedia and Physician, only those web page links previously identified in steps 96 and 98 and also indexed with such selections in classification categories DATA FORMAT and TARGET AUDIENCE, respectively, would not be eliminated from the web page hits contained in RESULTS.

In a further preferred embodiment, following step 104, if an automatic registration functionality is desired or required for retrieving web pages of registration information sources, steps including identical or similar operations as set forth the process 50 described above can be performed as suitable.

In step 106, the server engine 12 transmits the web page hits remaining in RESULTS to the browser 22 of the user 20 so that they are displayed in rank order from highest to lowest. As part of step 112, the query server 32 eliminates any duplicates of an identified web page hit which have a lower final rank value than the highest rank value for the same identified web page hit, such that only web page hits having the highest final rank value are reported.

Thus, in operation of the system 10 in connection with the process 70 and the illustrative Examples 1 and 2, a user desiring to obtain specialized medical information concerning lung cancer would enter "lung cancer" as the search query and also, for purposes of illustration, select "patient" and "text" as selections of the classification categories TARGET AUDIENCE and DATA FORMAT, respectively. The value in ID corresponding to "lung cancer" would be used to identify related values in SYNOID in the CONCEPT table and, consequently, to identify a word or word string in TERM corresponding to such identified values in SYNOID. Then, the same steps would be performed as above for each of the words "lung" and "cancer" in the search query to expand the parameters of the selection search string ultimately obtained. The selection search string would include the original search query and the expansion word(s) or word string(s) identified. The parameters in the selection search string would be used to scan the index fields in the indexed database and identify web page hits.

Final rank values would be computed for the identified web page hits based on whether identification of the web page hits resulted from a match with data in the title or full text content index field, the frequency of occurrences of the search parameters within the bodies of the respective web pages identified as hits and the relative proximity of search parameters to one another within the bodies of the respective web pages identified as hits. The Web page hits reported in the search results would be limited by the selections in the classification categories selected by the user. Referring to Examples 1 and 2, only web page hits corresponding to the selected category(ies) for the final search parameters, for example, the web page hit corresponding to the link address $MED.com, can be reported.

Although preferred embodiments of the present invention have been described and illustrated, it will be apparent to those skilled in the art that various modifications may be made without departing from the principles of the invention.

What is claimed is:

1. A method for accessing information sources using a search engine comprising the steps of:

receiving from a user at the search engine a search query and user identification data;

selecting, based on the search query, at least one information source indexed at an indexed database coupled to the search engine for access;

determining whether a selected indexed information source requires user registration before permitting user access; and automatically providing a registration identifier derived from the user identification data of the user to a selected indexed registration information source requiring user registration for access, whereby the selected indexed registration information source permits access by the user without the user acting to cause submission of any user identification data to the selected indexed registration information source for achieving user registration.

2. The method of claim 1 further comprising:

retrieving a registration identifier for the user corresponding to the selected registration information source, wherein the registration identifier is stored in a user identification database coupled to the search engine; and maintaining in the user identification database a record of transaction data for the user concerning each access of an information source which requires registration for access.

3. The method of claim 2, where the maintaining step further includes storing in the user identification database transaction data transmitted by one or more of the registration information sources concerning any purchase of a product or service available for purchase at the indexed registration information source accessed by the user.

4. The method of claim 1 further comprising classifying web pages of the information sources in the indexed information database by format of web page, subject matter and target audience.

5. The method of claim 1, wherein the indexed information source includes web pages indexed by title and full text content and wherein the search query constitutes a word or word string, and wherein the searching further comprises:

(A) generating at least one expansion word for each word in the search query and the word string, if any, constituting the search query using semantic network expansion;

(B) determining whether the title or the content of each of the indexed web pages contains the exact word or word string constituting the search query;

(C) determining whether the title or the content of each of the indexed web pages contains any word in the search query;

(D) determining whether the title or the content of each of the indexed web pages contains any expansion words generated from the exact word or word string constituting the search query;

(E) determining whether the title or the content of each of the indexed web pages contains, for each word in the search query, the word or any of the expansion words for the word;

(F) assigning first, second, third and fourth initial rank values where the determinations in steps (B), (C), (D) and (E), respectively, are affirmative for the title of an indexed web page; and (G) assigning fifth, sixth, seventh and eighth initial rank values where the determinations in steps (B), (C), (D) and (E), respectively, are affirmative for the content of an indexed web page.

6. The method of claim 5 further comprising:

(H) for each of the web pages where the determination made in steps (B), (C), (D) and (E) was affirmative, using the search query and the expansion words to generate frequency of occurrence and relative proximity data from the corresponding full text content; and (I) computing a final-rank value based on the initial rank values assigned in step (F) or (G) and the frequency and relative proximity data.

7. The method of claim 1 further comprising:

establishing a user web page database;

saving each search query and search results corresponding to the search query obtained for the user at a user web page maintained at the user web page database;

repeating a search previously performed by the user at predetermined time intervals selected by the user;

updating the search results for the repeated search at the user web page; and notifying the user that the search results for the repeated has been updated.

8. The method of claim 7, wherein the notifying includes electronically communicating with the user.

9. A method for accessing health care and medical information sources using a search engine comprising the steps of:

receiving at the search engine user identification data from a user;

receiving at the search engine a search query and at least one selected searching classification from the user;

selecting, based on the search query and the searching classification, at least one health care and medical information source indexed at an indexed database coupled to the search engine for access, wherein the indexed information source is indexed using a plurality of classifications;

determining whether a selected indexed information source requires user registration before permitting user access;

automatically providing a registration identifier derived from user identification data of the user to selected indexed registration information source requiring user registration for access, whereby the selected indexed registration information source is searchable and search results of searching of the registration information source are retrievable without the user acting to cause submission of any user identification data to the selected registration information source for achieving user registration; and saving the search query, the user selected classification and the search results for the search query at a user web page maintained at a user web page database coupled to the search engine.

10. A server system for accessing information sources comprising:

a user identification database for storing user identification data;

an indexed database storing classification categories of indexed web pages of respective information sources; and a server coupled to the user identification database and the indexed database for receiving an access request from a user and accessing the Indexed web pages of at least one of the indexed information sources, wherein the server automatically provides registration data derived from the user identification data of the user stored in the user identification database to an indexed registration information source being accessed and requiring user registration for access such that the indexed registration information source requiring user registration is accessible without the user acting to cause submission of any user identification data to the registration information source for achieving user registration.

11. The system of claim 10, wherein the access request includes a search query constituting a word or word string, wherein the indexed information source includes web pages indexed by title and full text content and wherein the server searches for information by:

(A) generating at least one expansion word for each word in the search query and the word string, if any, constituting the search query using semantic network expansion;

(B) determining whether the title or the content of each of the indexed web pages contains the exact word or word string constituting the search query;

(C) determining whether the title or the content of each of the indexed web page contains any word in the search query;

(D) determining whether the title or the content of each of the indexed web pages contains any expansion word generated from the exact word or word string constituting the search query;

(E) determining whether the title or the content of each of the indexed web pages contains, for each word in the search query, the word or any of the expansion words for the word;

(F) assigning first, second, third and fourth initial rank values where the determinations in steps (B), (C), (D) and (E), respectively, are affirmative for the title of an indexed web page;

(G) assigning fifth, sixth, seventh and eighth initial rank values where the determinations in steps (B), (C), (D) and (E), respectively, are affirmative for the content of an indexed web page;

(H) for each of the web pages where the determination made in steps (B), (C), (D) and (E) was affirmative, using the search query and the expansion words to generate frequency of occurrence and relative proximity data from the corresponding full text content; and (I) computing a final rank value based on the initial rank values assigned in step (F) or (G) and the frequency and relative proximity data.

12. The system of claim 10, wherein the classification categories include type of information format included on a web page, content of web page and target audience of web page.

13. The method of claim 1, further comprising:

before the step of automatically providing the registration identifier to the selected indexed registration information source, having the user confirm that user registration should be performed at the selected indexed registration information source.

14. The method of claim 9, further comprising:

before the step of automatically providing the registration identifier to the selected indexed registration information source, having the user confirm that user registration should be performed at the selected indexed registration information source.

* * * * *

UNITED STATES PATENT AND TRADEMARK OFFICE
CERTIFICATE OF CORRECTION

PATENT NO. : 6,654,749 B1  Page 1 of 1
DATED : November 25, 2003
INVENTOR(S) : Ashraf F. Nashed It is certified that error appears in the above-identified patent and that said Letters Patent is hereby corrected as shown below:

Drawings,
Figure 1, right hand column, "Source" should read -- Sources --.
Figure 3, box 96, line 2, "title. Link" should read -- title, link --.
Figure 3, box 98, line 2, "title. Link" should read -- title, link --.

Column 5,
Line 14, "Which the system" should read -- which the system --.

Column 16,
Line 46, "Indexed web pages" should read -- indexed web pages --.

Signed and Sealed this

Thirtieth Day of March, 2004

JON W. DUDAS
*Acting Director of the United States Patent and Trademark Office*